(12) United States Patent
Miyoshi et al.

(10) Patent No.: US 8,130,796 B2
(45) Date of Patent: Mar. 6, 2012

(54) RADIO COMMUNICATION BASE STATION APPARATUS AND RADIO COMMUNICATION METHOD

(75) Inventors: Kenichi Miyoshi, Kanagawa (JP); Akihiko Nishio, Kanagawa (JP); Daichi Imamura, Kanagawa (JP); Hidetoshi Suzuki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 12/160,483

(22) PCT Filed: Jan. 19, 2007

(86) PCT No.: PCT/JP2007/050830
§ 371 (c)(1),
(2), (4) Date: Jul. 10, 2008

(87) PCT Pub. No.: WO2007/083762
PCT Pub. Date: Jul. 26, 2007

(65) Prior Publication Data
US 2011/0228757 A1    Sep. 22, 2011

(30) Foreign Application Priority Data
Jan. 20, 2006   (JP) .................. 2006-012436

(51) Int. Cl.
*H04J 3/06* (2006.01)
*H04J 1/00* (2006.01)
*H04L 5/14* (2006.01)

(52) U.S. Cl. ........ 370/514; 370/281; 370/295; 370/343; 370/350; 370/480

(58) Field of Classification Search .................. 370/350, 370/503, 509, 514, 281, 295, 343, 480
See application file for complete search history.

(56) References Cited

U.S. PATENT DOCUMENTS
7,012,908 B2   3/2006  Sasaki
7,024,191 B2   4/2006  Ofuji
(Continued)

FOREIGN PATENT DOCUMENTS
JP   2000-049744   2/2000
(Continued)

OTHER PUBLICATIONS

International Search Reprt dated Apr. 17, 2007.
(Continued)

*Primary Examiner* — Ronald Abelson
(74) *Attorney, Agent, or Firm* — Seed IP Law Group PLLC

(57) ABSTRACT

Provided is a base station capable of performing cell search of all mobile stations having different communicable frequency band widths in a scalable band width communication system to which a multi-carrier communication method such as the OFDM method is applied. The base station includes: a modulation unit (102) for modulating SCH data after being encoded; a sub carrier setting unit (105) for setting one of the sub carriers to a sub carrier (SCH sub carrier) constituting the OFDM symbol for SCH data transmission; and an IFFT unit (106) for mapping the SCH data to the sub carrier set by the sub carrier setting unit (105) among the sub carriers and performing IFFT to generate an OFDM symbol. The sub carrier setting unit (105) sets one of the sub carriers which has a frequency of a common multiple between the sub carrier interval and the cell search interval as an SCH sub carrier.

4 Claims, 5 Drawing Sheets

U.S. PATENT DOCUMENTS

2003/0103445 A1* 6/2003 Steer et al. .................... 370/208
2004/0252724 A1* 12/2004 Jou ............................... 370/480
2005/0220177 A1 10/2005 Lee

FOREIGN PATENT DOCUMENTS

| | | |
|---|---|---|
| JP | 2001-274655 | 10/2001 |
| JP | 2002-077103 | 3/2002 |
| JP | 2003-60551 | 2/2003 |
| WO | 00/65798 | 11/2000 |

OTHER PUBLICATIONS

TSG-RAN WG1 #42bis,R1-051147, NTT DoCoMo, Fujitsu, Mitsubishi Electric Corp., NEC, Panasonic, SHARP, Toshiba Corp., "Basic Structure of Control Channel and Synchronization Channel for Scalable Bandwidth in Evolved UTRA Downlink," Oct. 14, 2005, pp. 1-13.

Russian Office Action dated Jun. 8, 2010, with English Translation.

* cited by examiner

RADIO COMMUNICATION BASE STATION APPARATUS AND RADIO COMMUNICATION METHOD

TECHNICAL FIELD

The present invention relates to a radio communication base station apparatus and a radio communication method.

BACKGROUND ART

In the mobile communication system, a radio communication mobile station apparatus (hereinafter "mobile station") performs a cell search upon power activation or upon handover. This cell search is performed using an SCH (synchronization channel). The SCH is a shared channel in the downlink direction and is comprised of a P-SCH (primary synchronization channel) and an S-SCH (secondary synchronization channel). P-SCH data contains a sequence which is common in all cells and which is used for the timing synchronization upon the cell search. Further, S-SCH data contains cell-specific transmission parameters such as scrambling code information. In a cell search upon power activation or upon handover, each mobile station finds the timing synchronization by receiving P-SCH data and acquires transmission parameters that differ between cells by receiving S-SCH data. By this means, each mobile station can start communicating with radio communication base station apparatuses (hereinafter "base stations"). Therefore, each mobile station needs to detect SCH data upon power activation or upon handover.

Further, according to the FFD scheme standard proposed by 3GPP, frequencies for setting carriers are arranged at 200 kHz intervals in a 60 MHz frequency bandwidth (see Patent Document 1). Therefore, according to this standard, the frequency interval the mobile station performs a cell search is 200 kHz. That is, the mobile station performs a cell search every 200 kHz.

Further, to simplify the design of the communication system, the SCH is generally set in the center frequency of the frequency bandwidth in which a mobile station can perform communication.

By the way, in recent years, in mobile communication, various kinds of information such as images and data as well as speech are subjected to transmission. With this trend, it is expected that demands further increase for high reliability and high speed transmission. However, when high speed transmission is performed in mobile communication, the influence of delayed waves by multipath is not negligible, and transmission performance degrades due to frequency selective fading.

Multicarrier communication such as OFDM (Orthogonal Frequency Division Multiplexing) has attracted attention as one of counter techniques for frequency selective fading. Multicarrier communication refers to a technique of performing high speed transmission by transmitting data using a plurality of subcarriers of transmission rates suppressed to such an extent that frequency selective fading does not occur. Particularly, with the OFDM scheme, frequencies of a plurality of subcarriers where data is arranged are orthogonal to each other, thereby enabling the maximum frequency efficiency in multicarrier communication and implementation with relatively simple hardware configuration. By this means, the OFDM scheme has attracted attention as a communication method applied to cellular scheme mobile communication and is variously studied. In the communication system employing the OFDM scheme, the interval between adjacent subcarriers (subcarrier intervals) in a plurality of subcarriers, is set according to the coherence bandwidth (the frequency bandwidth in which channel fluctuation is the same) of this communication system.

Further, at present, according to the LTE standardization of 3GPP, in the mobile communication system with the OFDM scheme, allowing a plurality of mobile stations communicating in respective bandwidths, to perform communication in the system, is studied. This mobile communication system can be referred to as a "scalable bandwidth communication system."

For example, assuming the scalable bandwidth communication system having a 20 MHz operating frequency bandwidth, if the 20 MHz operating frequency bandwidth is equally divided per 5 MHz frequency bandwidth into four frequency bands FB1 FB2, FB3 and FB4, it is possible to use mobile stations having 5 MHz, 10 MHz or 20 MHz communication capacities at the same time. In the following explanation, out of a plurality of mobile stations that are available, the mobile station having the minimum communication capacity is referred to as the "minimum capacity mobile station," and the mobile station having the maximum communication capacity is referred to as the "maximum capacity mobile station." Therefore, in this case, the mobile station having the 5 MHz communication capacity is the minimum capacity mobile station and the mobile station having the 20 MHz communication capacity is the maximum capacity mobile station.

Further, for example, assuming the scalable bandwidth communication system with a 4.2 MHz operating frequency bandwidth, if the 4.2 MHz operating bandwidth is divided per 2.1 MHz frequency bandwidth into two bandwidths FB1 and FB2, it is possible to use a mobile station having a 2.1 MHz communication capacity and a mobile station having a 4.2 MHz communication capacity at the same time. Therefore, in the above, the mobile station having a 2.1 MHz communication capacity is the minimum capacity mobile station and the mobile station having a 4.2 MHz communication capacity is the maximum capacity mobile station. A mobile station having a 2.1 MHz communication capacity is referred to as a "2.1 MHz mobile station," and a mobile station having a 4.2 MHz communication capacity is referred to as a "4.2 MHz mobile station." In this scalable bandwidth communication system, the 2.1 MHz mobile station is assigned a 2.1 MHz frequency bandwidth out of the 4.2 MHz frequency bandwidth and performs communication. That is, the 2.1 MHz mobile station is assigned one of FB1 and FB2 and performs communication. Further, the 4.2 MHz mobile station can perform high speed communication using the entire 4.2 MHz operating frequency bandwidth. Here, as described above, the frequency bandwidth, in which the maximum capacity mobile station can perform communication, generally matches the frequency bandwidth where a scalable bandwidth communication system is operated (in this case, 4.2 MHz).

Patent Document 1: Japanese Patent Application Laid-Open No. 2003-60551

DISCLOSURE OF INVENTION

Problems to be Solved by the Invention

Here, assuming that the OFDM scheme is applied to a scalable bandwidth communication system as shown in FIG. 1, if the SCH is set in the center frequency of the frequency bandwidth in which a mobile station can perform communication, the mobile station that performs a cell search at predetermined cell search intervals as above may not be able to perform a cell search. For example, assume that the SCH for the 4.2 MHz mobile station is set in the center frequency $f_{c1}$ of a 4.2 MHz frequency bandwidth, and the SCH for the 2.1 MHz mobile station is set in the center frequency $f_{c2}$ of a 2.1 MHz frequency bandwidth. Further, assume that the subcarrier interval is set 150 kHz according to the coherence bandwidth in the communication system. Further, assume that the cell search interval is 200 kHz as above. Here, if the center frequency $f_{c1}$ is set a frequency that is an integral multiple of the 200 kHz cell search interval, although the 4.2 MHz mobile station can detect the SCH, the 150 kHz subcarrier interval makes the 2.1 MHz mobile station unable to detect the SCH and perform a cell search. By contrast, if the center frequency $f_{c2}$ is set the frequency that is an integral multiple of the 200 kHz cell search interval, although the 2.1 MHz mobile station can detect the SCH, the 150 kHz subcarrier interval makes the 4.2 MHz mobile station unable to detect the SCH and perform a cell search. Thus, if the OFDM scheme is applied to a scalable bandwidth communication system where there are a plurality of mobile stations communicating in respective bandwidths, there are mobile stations that cannot perform a cell search depending on the relationship between the subcarrier interval and the cell search interval.

One possible solution to this problem is to decide the subcarrier interval according to the cell search interval. To be more specific, making the cell subcarrier a divisor of the search interval, is possible. However, with this solution, it is not always possible to set an optimal subcarrier interval according to the coherence bandwidth, and, consequently, throughput degradation and error rate performance degradation may be caused.

It is therefore an object of the present invention to provide, in the scalable bandwidth communication system adopting the OFDM scheme, a base station and radio communication scheme for enabling all of a plurality of mobile stations communicating in respective frequency bandwidths, to perform a cell search.

Means for Solving the Problem

The radio communication base station of the present invention that transmits a multicarrier signal comprised of a plurality of subcarriers, employs a configuration having: a setting section that sets one of the plurality of subcarriers as a first subcarrier for transmitting a synchronization channel signal; a generating section that generates the multicarrier signal by mapping the synchronization channel signal on the first subcarrier; and a transmitting section that transmits the multicarrier signal, and the configuration in which, among the plurality of subcarriers, the setting section sets, as the first subcarrier, one of subcarriers having frequencies of common multiples of the subcarrier interval between the plurality of subcarriers and a frequency interval in which a radio communication mobile station performs a cell search.

Advantageous Effect of the Invention

According to the present invention, all of a plurality of mobile stations communicating in respective frequency bandwidths can perform a cell search in the scalable bandwidth communication system adopting, for example, the OFDM scheme.

BEST MODE FOR CARRYING OUT THE INVENTION

An embodiment of the present invention will be explained below in detail with reference to the accompanying drawings. Here, in the following explanation, although the OFDM scheme is explained as an example of a multicarrier communication scheme, the present invention is not limited to the OFDM scheme.

Figure 1:
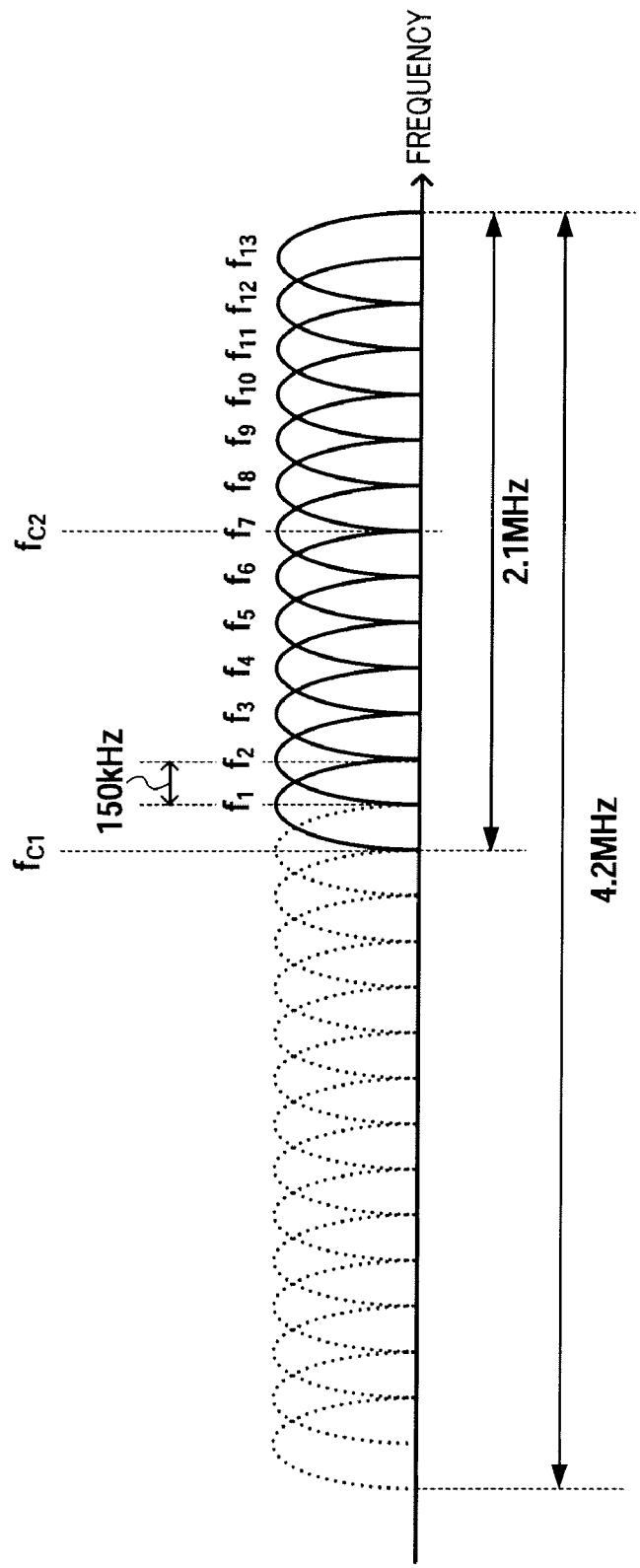
FIG. 1 illustrates a scalable bandwidth communication system adopting an OFDM scheme.
Figure 2:
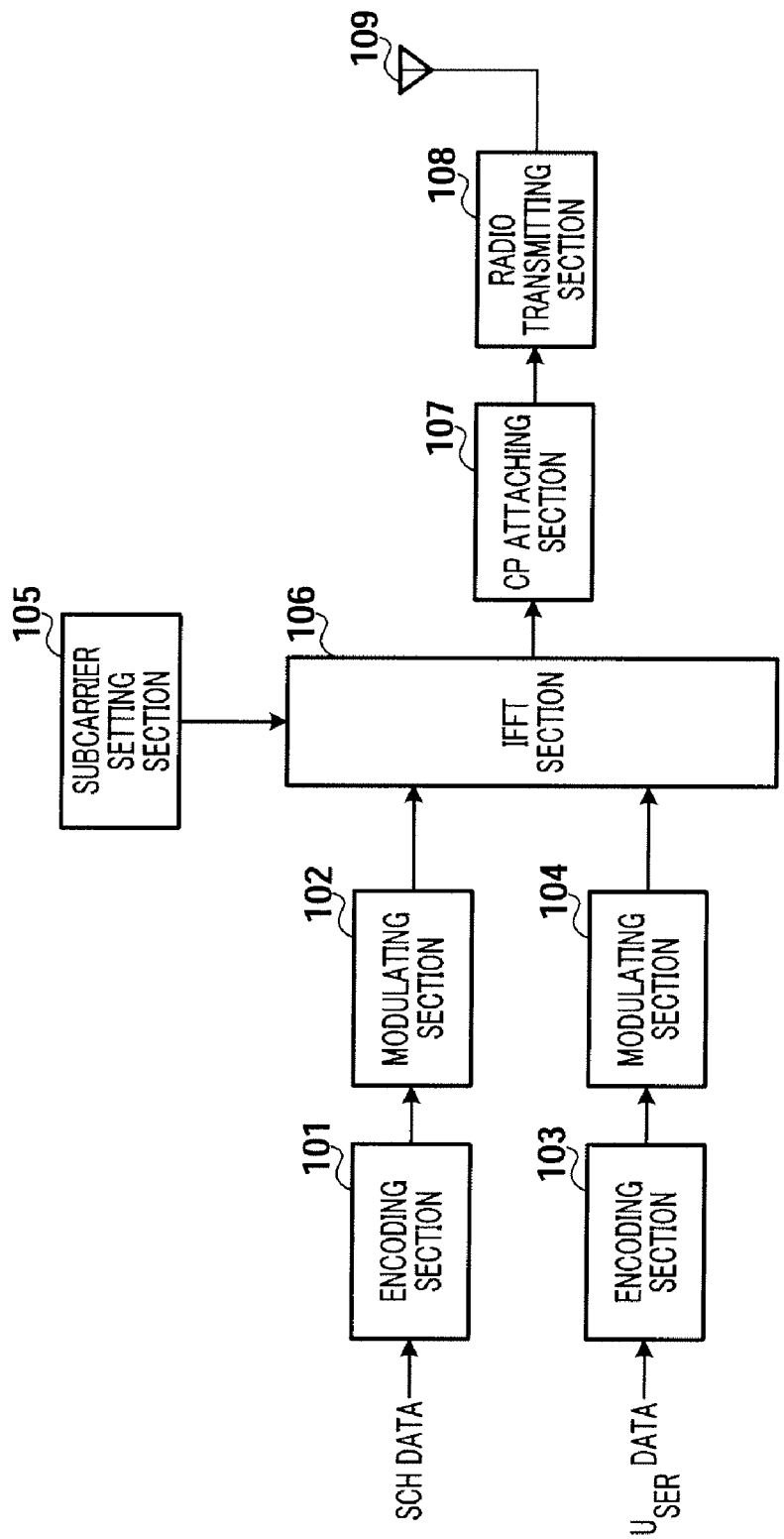
FIG. 2 is a block diagram showing a configuration of a base station according to an embodiment of the present invention.

FIG. 2 illustrates the configuration of base station 100.

Encoding section 101 encodes SCH data.

Modulating section 102 modulates the encoded SCH data.

Encoding section 103 encodes user data.

Modulating section 104 modulates the encoded user data.

Subcarrier setting section 105 sets one of a plurality of subcarriers forming an OFDM symbol, which is a multicarrier signal, as the subcarrier for transmitting SCH data (SCH subcarrier). This subcarrier setting will be described later in detail.

According to the setting in subcarrier setting section 105, IFFT section 106 maps SCH data and user data on the multiple subcarriers above and performs an IFFT (Inverse Fast Fourier Transform), thereby generating an OFDM symbol. In this case, out of the multiple subcarriers above, IFFT section 106 maps SCH data on the subcarrier set in subcarrier setting section 105.

The OFDM symbol generated as above is attached a cyclic prefix (CP) in CP attaching section 107, subjected to predetermined radio processing such as up-conversion in radio transmitting section 108, and transmitted by radio from antenna 109 to mobile stations.

Here, in the OFDM scheme, to prevent intersymbol interference ("ISI"), the tail end of each ODFM symbol is attached to the head of that OFDM symbol as a CP. By this means, a mobile station which is the receiving side can prevent ISI as long as the delay time of delay weaves stays within the range of the CP time period.

Next, subcarrier setting in subcarrier setting section 105 will be explained in detail. Setting examples 1 to 3 (FIGS. 3 to 5) will be explained below. Here, as above, the scalable bandwidth communication system is assumed where the operating frequency bandwidth is 4.2 MHz and there are a 2.1 MHz mobile station and a 4.2 MHz mobile station. Further, assume that the subcarrier interval is set 150 kHz as above. Further, assume that the cell search interval is set 200 kHz as above.

Setting Example 1

FIG. 3

Figure 3:
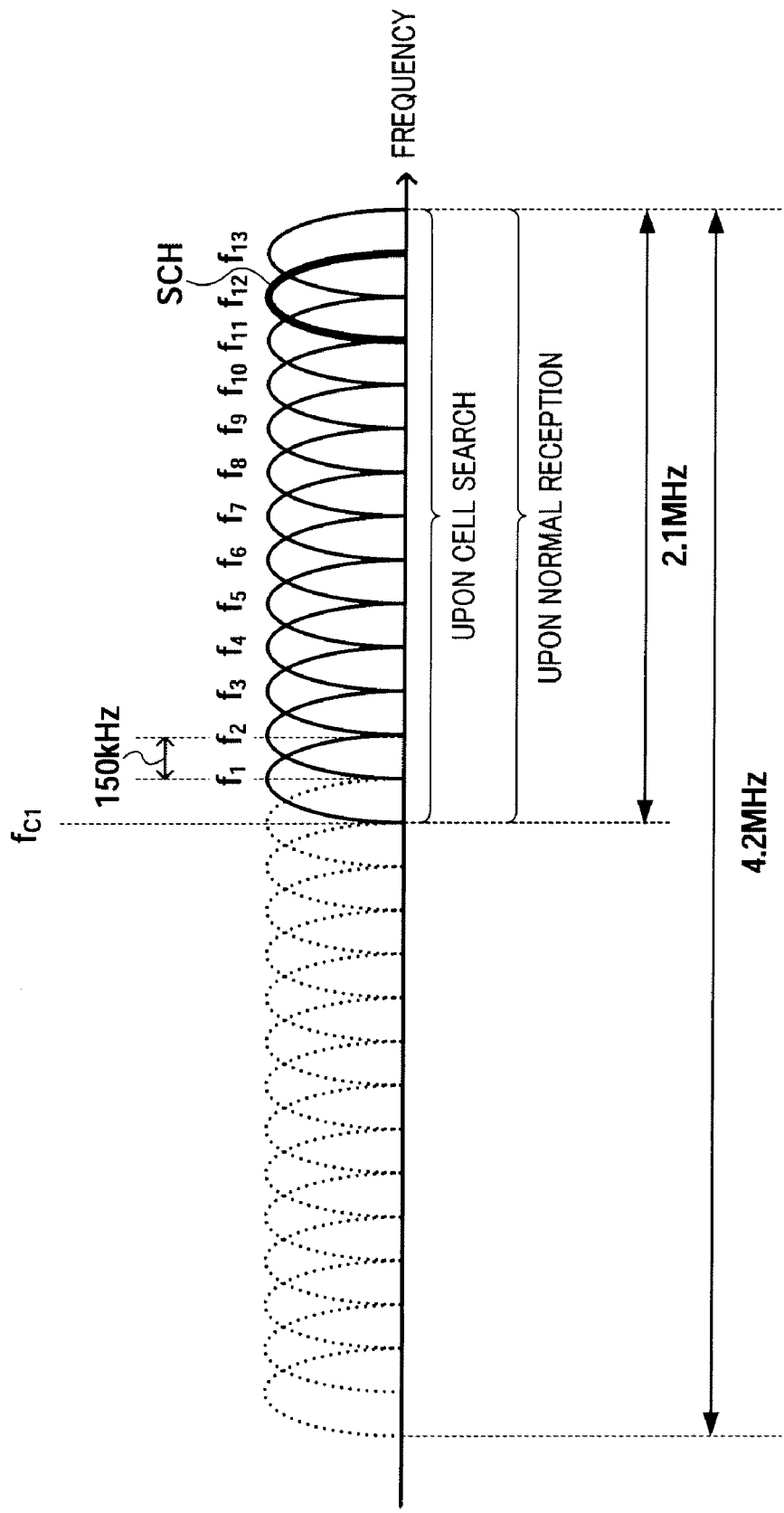
FIG. 3 illustrates an SCH setting example according to an embodiment of the present invention (setting example 1)

Subcarrier setting section 105 sets, as the SCH subcarrier, one of subcarriers having frequencies of common multiples of the subcarrier interval and the cell search interval, among the above multiple subcarriers. That is, subcarrier setting section 105 sets, as the SCH subcarrier, one of subcarriers having frequencies of common multiples of the 150 kHz subcarrier interval and the 200 kHz cell search interval (600 kHz×n, where n is a natural number). To be more specific, for example, as shown in FIG. 3, subcarrier setting section 105 sets, as the SCH subcarrier, subcarrier $f_{12}$ having a frequency 1.8 MHz greater than the center frequency $f_{c1}$ of 4.2 MHz. Therefore, for example, if the center frequency $f_{c1}$ is set 2 GHz, the frequency of subcarrier $f_{12}$ is 2001.8 MHz, which is an integral multiple of the 200 kHz cell search interval.

Thus, according to the present setting example, the SCH can be set in a subcarrier having an integral multiple frequency of the cell search interval among a plurality of subcarriers having predetermined subcarrier intervals, so that both the 2.1 MHz mobile station and the 4.2 MHz mobile station having the same cell search interval can detect the SCH and perform a cell search.

As shown in FIG. 3, the 2.1 MHz mobile station needs not change the communication frequency band between the time during cell search and other times such as during normal reception, and, consequently, is able to receive all user data that can be received during normal reception during cell search, so that it is possible to prevent throughput degradation according to the change of the communication frequency band. Further, the 2.1 MHz mobile station needs not change the communication frequency band between the time during cell search and the time during normal reception, that is, the 2.1 MHz mobile station needs not switch the center frequency in radio reception between the time during cell search and the time during normal reception, so that it is possible to ease control upon a cell search and reduce power consumption of mobile stations.

Setting Example 2

FIG. 4

In the above multiple subcarriers, subcarrier setting section 105 sets, as the SCH subcarrier, the subcarrier that is closest to the center frequency of the frequency bandwidth in which a mobile station can perform communication, out of subcarriers having frequencies of common multiples of the subcarrier interval and the cell search interval.

Figure 4:
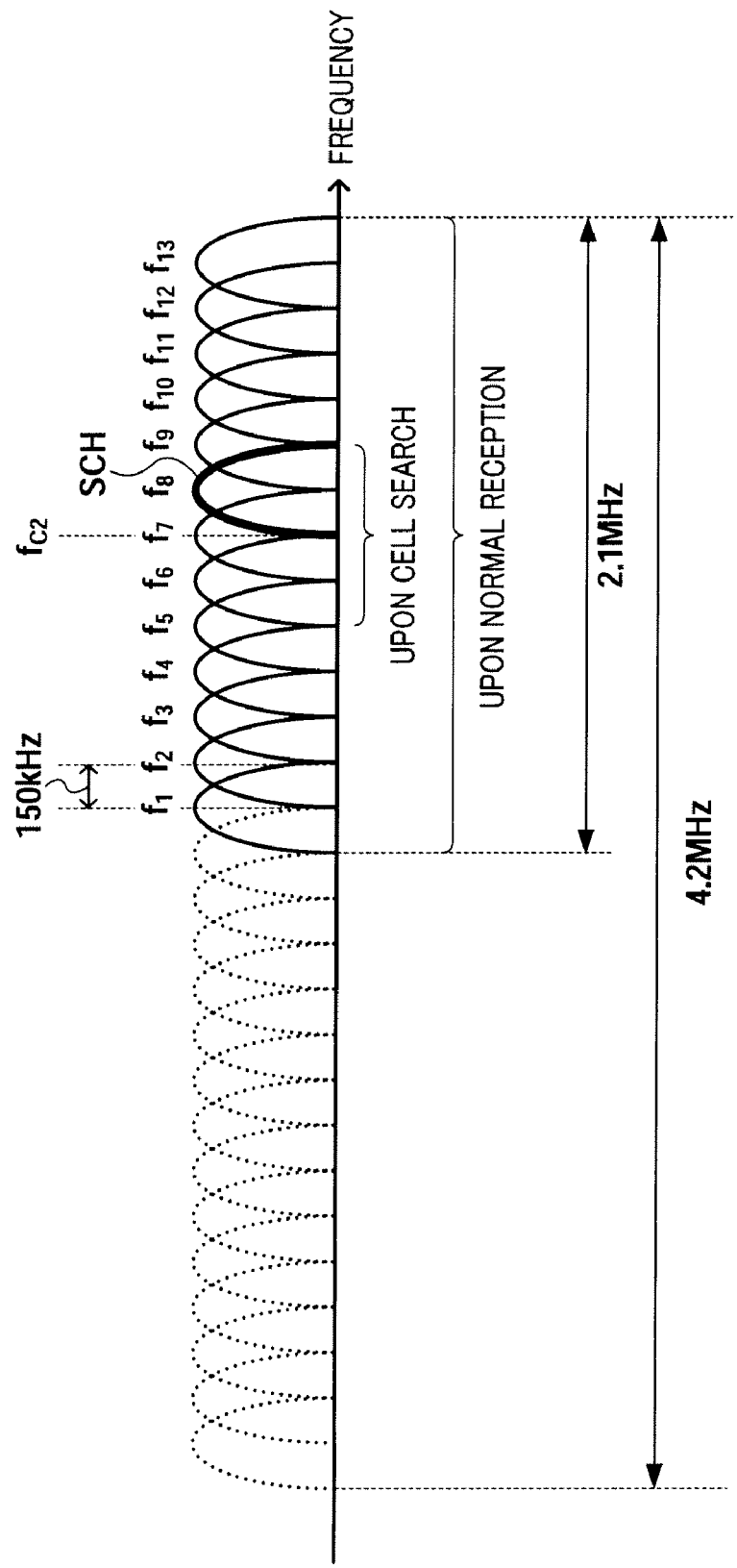
FIG. 4 illustrates an SCH setting example according to an embodiment of the present invention (setting example 2)

To be more specific, for example, as shown in FIG. 4, subcarrier setting section 105 sets, as the SCH subcarrier, subcarrier $f_8$ that is closest to the center frequency $f_{c2}$ of 2.1 MHz, out of subcarriers having 600×n frequencies (n is a natural number). That is, with the present setting example, among the subcarriers having 600 kHz×n frequencies (n is a natural number), the SCH subcarrier is set in the subcarrier that is closest to the center frequency of a frequency bandwidth which is narrower than the operating frequency bandwidth of the scalable bandwidth communication system and in which mobile stations other than the maximum capacity mobile stations can perform communication. Specifically, with the present setting example, all of a plurality of mobile stations communicating in respective frequency bandwidths need not switch the center frequency in radio communication between the time during cell search and the time during normal reception, so that it is desirable to set, as the SCH subcarrier, the subcarrier that is closest to the center frequency of the frequency bandwidth in which the maximum capacity mobile station can perform communication.

Therefore, according to the present setting example, as in setting example 1, the SCH can be set in a subcarrier having an integral multiple frequency of the cell search interval among a plurality of subcarriers having predetermined subcarrier intervals, so that the 2.1 MHz mobile station and the 4.2 MHz mobile station having the same cell search interval can detect the SCH and perform a cell search.

Further, according to the present setting example, as in setting example 1, the 2.1 MHz mobile station needs not change the communication frequency band between the time during cell search and the other times such as during normal reception, and, consequently, is able to receive all user data that can be received during normal reception during cell search, so that it is possible to prevent throughput degradation according to the change of the communication frequency band. Further, the 2.1 MHz mobile station needs not change the communication frequency band between the time during cell search and the time during normal reception, that is, the 2.1 MHz mobile station needs not switch the center frequency in radio reception between the time during cell search and the time during normal reception, so that it is possible to ease control during cell search and reduce power consumption of mobile stations.

Further, according to the present setting example, as shown in FIG. 4, the communication frequency bandwidth during cell search can be set narrower than the communication frequency bandwidth during normal reception, so that it is possible to make the sampling rate for A/D conversion during cell search smaller than the sampling rate for A/D conversion during normal reception, and, as a result, further reduce power consumption of mobile stations.

Setting Example 3

FIG. 5

In the above multiple subcarriers, subcarrier setting section 105 sets, as the SCH subcarrier, the subcarrier that is closest to the center frequency of the operating frequency bandwidth of the communication system, among the subcarriers having frequencies of common multiples of the subcarrier interval and the cell search interval.

Figure 5:
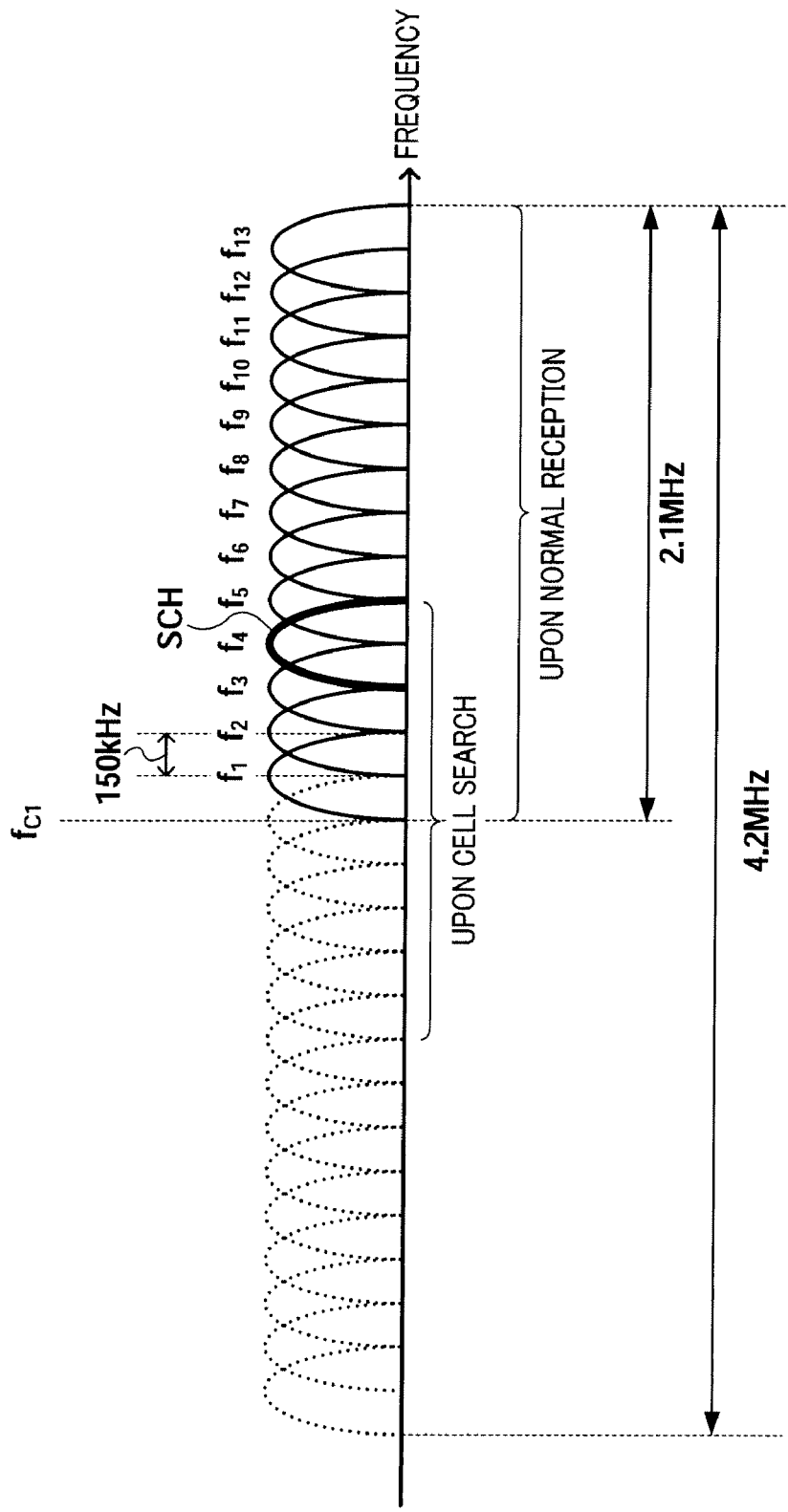
FIG. 5 illustrates an SCH setting example according to an embodiment of the present invention (setting example 3).

To be more specific, for example, as shown in FIG. 5, subcarrier setting section 105 sets, as the SCH subcarrier, subcarrier $f_4$ that is closest to the center frequency $f_{c1}$ of 4.2 MHz, among the subcarriers having 600 kHz×n frequencies (n is a natural number). That is, with the present setting example, the SCH subcarrier is set the subcarrier that is closest to the center frequency of the operating frequency bandwidth of the scalable bandwidth communication system, among the subcarriers having 600 kHz×n frequencies (n is a natural number). In other words, with the present setting example, the SCH subcarrier is set the subcarrier that is closest to the center frequency of the frequency bandwidth in which the maximum capacity mobile station can perform communication, among the subcarriers having 600 kHz×n frequencies (n is a natural number).

Therefore, according to the present setting example, as in setting example 1, the SCH can be set in a subcarrier having an integral multiple frequency of the cell search interval among a plurality of subcarriers having predetermined subcarrier intervals, so that both the 2.1 MHz mobile station and the 4.2 MHz mobile station having the same the cell search interval can detect the SCH and perform a cell search.

Further, according to the present setting example, as shown in FIG. 5, the communication frequency bandwidth during cell search can be set narrower than the communication frequency bandwidth during normal reception, so that it is possible to make the sampling rate for A/D conversion during cell search smaller than the sampling rate for A/D conversion during normal reception, and, as a result, further reduce power consumption of mobile stations.

Here, compared to the present setting example to setting example 2, while the SCH subcarrier is set the subcarrier having the frequency that is closest to the center frequency $f_{c2}$ in setting example 2, the SCH subcarrier is set the subcarrier having the frequency that is closest to the center frequency $f_{c1}$ in the present setting example. By this means, the present setting example is particularly useful when there are more maximum capacity mobile stations than the other mobile stations, and setting example 2 is useful in the opposite case.

Thus, according to the present embodiment, in the scalable bandwidth communication system adopting a multicarrier communication scheme such as the OFDM scheme, all of a plurality of mobile stations communicating in respective frequency bandwidths are able to perform a cell search.

One embodiment of the present invention has been described above.

Here, the present invention is applicable to other shared channels than the SCH channel. As a shared channel other than the SCH, for example, there are BCH (broadcast channel) and SCCH (shared control channel).

Further, a base station may be referred to as "Node B," a mobile station as "UE," a subcarrier as a "tone," a cyclic prefix as a "guard interval."

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-012436, filed on Jan. 20, 2006, including the specification, drawings and abstract, is incorporated herein by reference in its entirety.

INDUSTRIAL APPLICABILITY

The present invention is suitable to, for example, OFDM mobile communication systems.

The invention claimed is:

1. A radio communication base station apparatus that transmits a multicarrier signal comprised of a plurality of subcarriers, the radio communication base station apparatus comprising:
    a setting section that sets one of the plurality of subcarriers as a first subcarrier for transmitting a synchronization channel signal;
    a generating section that generates the multicarrier signal by mapping the synchronization channel signal on the first subcarrier; and
    a transmitting section that transmits the multicarrier signal,
    wherein, among the plurality of subcarriers, the setting section sets, as the first subcarrier, one of the plurality of subcarriers having frequencies of common multiples of a subcarrier interval between the plurality of subcarriers and a frequency interval in which a radio communication mobile station performs a cell search, and
    the subcarrier interval does not have a value that is a divisor of the frequency interval.

2. The radio communication base station apparatus according to claim 1, wherein the setting section sets, as the first subcarrier, a subcarrier that is closest to a center frequency of a frequency bandwidth in which the radio communication mobile station can perform communication, out of the subcarriers having frequencies of common multiples.

3. The radio communication base station apparatus according to claim 1, wherein the setting section sets, as the first subcarrier, a subcarrier that is closest to a center subcarrier of an operating frequency bandwidth of a communication system, out of the subcarriers having frequencies of common multiples.

4. A radio communication method performed by a radio communication base station apparatus that sets one of a plurality of subcarriers forming a multicarrier signal, as a first subcarrier for transmitting a synchronization channel signal, the radio communication method comprising:
    setting, as the first subcarrier, one of the plurality of subcarriers having frequencies of common multiples of a subcarrier interval of the plurality of subcarriers and a frequency interval in which a radio communication mobile station performs a cell search, and
    transmitting the multicarrier signal,
    wherein the subcarrier interval does not have a value that is a divisor of the frequency interval.

* * * * *